UNITED STATES PATENT OFFICE.

WILLIAM D. RENNIE, OF HACKENSACK, NEW JERSEY. ASSIGNOR TO UNIVERSAL ORE REDUCTION COMPANY, OF PHOENIX, ARIZONA TERRITORY, A CORPORATION OF ARIZONA TERRITORY.

ART OF EXTRACTING METALS, SUCH AS GOLD, SILVER, COPPER, OR NICKEL, FROM THEIR NATIVE ORES.

989,802.  Specification of Letters Patent.  Patented Apr. 18, 1911.

No Drawing.  Application filed April 19, 1910. Serial No. 556,361.

*To all whom it may concern:*

Be it known that I, WILLIAM D. RENNIE, a citizen of the United States, and resident of Hackensack, county of Bergen, and State of New Jersey, have made a new and useful Invention in the Art of Extracting Metals— Such as Gold, Silver, Copper, or Nickel— from Their Native Ores, of which the following is a specification.

The present invention is directed particularly to a novel electrolytic process for effecting the extraction of metals of the nature above referred to from refractory ores thereof, such, for instance, as ores containing pyrites where the metal, for instance gold, is coated exteriorly with iron, or an oxid of iron; or such externally coated ores generally as will not ordinarily be reduced in practice by mercury, in the usual process wherein mercury is utilized, owing to their coated condition and to the fact that the mercury cannot, therefore, act upon the metal until the coating is first removed.

My novel process consists broadly in treating a mixture or composition of water, fluor-spar and a powder of the ore to be treated to the action of an electrical current as this mixture is caused to flow or pass between the anodes and cathodes of an electrolytic cell, and to this end I prefer to utilize with the powdered ore a salt, such as fluor-spar, and water in the following proportions:—2,000 pounds of powdered ore; 2,000 pounds of water and 300 pounds of the salt, such, for instance, as fluor-spar. The powdered ore and water are thoroughly mixed and then caused to circulate, as above indicated, between the anodes and cathodes of the cell by any of the well known methods of agitation or circulation and the current potential is adjusted to suit the conductivity of the particular ore being treated. This action is continued during the treatment of the ore for a period of 6 hours. At the start, however, 100 pounds of the fluor-spar is used and at the end of two hours a second 100 pounds are added, the remaining 100 pounds being added at the end of 4 hours and the process continuing for the extraction of the metal an additional 2 hours. This action as thus continued will cause the metal, say gold, to be extracted and deposited upon the cathode of the cell, usually to the extent of from 90 to 94% thereof. This process will answer for all simple refractory ores and the resultant electrolyte, after the first action, may again be used for a new charge by adding, after each action, 45 pounds of fluor-spar per 2,000 pounds of ore. I add this as follows:—15 pounds at the start; 15 pounds, two hours later, and the remaining 15 pounds at the end of four hours, the process continuing as before for the succeeding two hours.

I have ascertained that by mixing fluor-spar with powders of the ores hereinbefore described, which ores usually contain iron, and in stated proportions as described, and causing such mixture to pass between the electrodes in an electrolytic cell and under the usual methods of circulation, there results a resolvent which will dissolve the metal and deposit the same on the cathode, and this without the use of any acid whatever.

Having thus described my invention what I claim and desire to secure by Letters Patent of the United States is—

1. The described process of electrolytically extracting a metal from its ore, consisting in subjecting a mixture or composition containing water, a powder of the ore and fluor-spar to the electrolytic action of a source of electrical energy, until substantially all of the metal is deposited on the cathode of the cell.

2. The described process of electrolytically extracting a metal from the powdered ore thereof, consisting in causing a mixture embracing the powder of the ore and fluor-spar in suspension in water to be passed between the anode and cathode of an electrolytic cell until substantially all of the metal is deposited on the cathode of the cell.

3. The described process of electrolytically extracting a metal from its ore, consisting in causing a mixture embracing the powdered ore and fluor-spar in suspension to be circulated continuously between the anode and cathode of an electrolytic cell and simultaneously subjected to the current action of the cell, until substantially all of the metal is deposited on the cathode thereof.

4. The described process of electrolytically extracting a metal from its ore, consisting in first mixing water and a powder of the ore and then causing the mixture to flow or be moved continuously between the anodes and cathodes of an electrolytic cell connected to a source of electrical energy; then adding a definite amount of a salt, as fluor-spar, and subsequently adding a like definite amount of the same salt at a definite period of time thereafter; again adding a further like amount of said salt at a further subsequent period thereafter, and finally continuing the movement of the electrolyte and electrolytic action until practically all of the metal has been deposited on the cathode of the cell.

5. The described process of electrolytically extracting a metal from an ore containing pyrites, consisting in subjecting a mixture or composition containing water, a powder of the ore and fluor-spar to the electrolytic action of a source of electrical energy, until substantially all of the metal is deposited on the cathode of the cell.

6. The described process of electrolytically extracting a metal from a powdered ore containing pyrites, consisting in causing a mixture embracing the powder of the ore and fluor-spar in suspension in water to be passed between the anode and cathode of an electrolytic cell until substantially all of the metal is deposited on the cathode of the cell.

7. The described process of electrolytically extracting a metal from an ore containing pyrites, consisting in causing a mixture embracing the powdered ore and fluor-spar in suspension to be circulated continuously between the anode and cathode of an electrolytic cell and simultaneously subjected to the current action of the cell until substantially all of the metal is deposited on the cathode thereof.

8. The described process of electrolytically extracting a metal from an ore containing pyrites, consisting in first mixing water and a powder of the ore continuously between the anodes and cathodes of an electrolytic cell connected to a source of electrical energy; then adding a definite amount of a salt, as fluor-spar, and subsequently adding a like definite amount of the same salt at a definite period of time thereafter; again adding a further like amount of said salt at a further subsequent period thereafter, and finally continuing the movement of the electrolyte and electrolytic action until practically all of the metal has been deposited on the cathode of the cell.

In testimony whereof I have signed my name to this specification in the presence of two subscribing witnesses.

WILLIAM D. RENNIE.

Witnesses:
 BARTON B. WARD,
 C. J. KINTNER.

---

Copies of this patent may be obtained for five cents each, by addressing the "Commissioner of Patents, Washington, D. C."